United States Patent [19]
Murakami et al.

[11] 3,946,760
[45] Mar. 30, 1976

[54] HYDRAULIC MODULATOR VALVE

[75] Inventors: Noboru Murakami, Nagoya; Koichiro Hirozawa, Kariya; Shigeo Takahashi, Hekinan, all of Japan

[73] Assignee: Aisin Seiki Kabushiki Kaisha, Kariya, Japan

[22] Filed: Aug. 9, 1974

[21] Appl. No.: 496,263

Related U.S. Application Data
[63] Continuation of Ser. No. 269,102, July 5, 1972, abandoned.

[30] Foreign Application Priority Data

| July 8, 1971 | Japan | 46-50812 |
| July 10, 1971 | Japan | 46-51168 |
| Sept. 9, 1971 | Japan | 46-69981 |

[52] U.S. Cl. .................... 138/31; 60/413; 91/447; 91/468; 138/46; 192/109 F; 251/120
[51] Int. Cl.² ................. F15B 13/042; F16L 55/04
[58] Field of Search .................. 138/43, 45, 46, 31; 192/109 F; 137/505.18, 505, 625.3; 251/120; 91/447, 443, 468; 60/413

[56] References Cited
UNITED STATES PATENTS

| 1,871,287 | 8/1932 | Whittaker | 138/46 |
| 2,384,394 | 9/1945 | Patton | 138/43 |
| 2,402,729 | 6/1946 | Buchanan | 138/43 |
| 3,174,505 | 3/1965 | Bauer | 137/505.18 |
| 3,213,874 | 10/1965 | Schmiel et al. | 91/447 X |
| 3,216,444 | 11/1965 | Herner | 91/443 X |
| 3,583,422 | 10/1968 | Dach et al. | 192/109 F |
| 3,656,600 | 4/1972 | Kitano et al. | 192/109 F |

FOREIGN PATENTS OR APPLICATIONS

| 1,221,119 | 2/1971 | United Kingdom | 192/109 F |

*Primary Examiner*—Irwin C. Cohen
*Attorney, Agent, or Firm*—Berman, Aisenberg & Platt

[57] ABSTRACT

Disclosed herein is a hydraulic modulator valve for a control system of a hydraulically operated mechanism having a casing with a bore therein, a stepped spool axially and slidably engaged within the bore to form an annular fluid throttle passage against the circumference of the bore between a first and a second ports drilled through the casing, and spool actuator for controlling axial displacement of the spool. The stepped spool comprises a large diameter portion to be hermetically engaged within the bore, a small diameter portion and a medium diameter portion in sequence, the throttle passage being formed by the bore and the medium and small portions of the spool.

2 Claims, 13 Drawing Figures

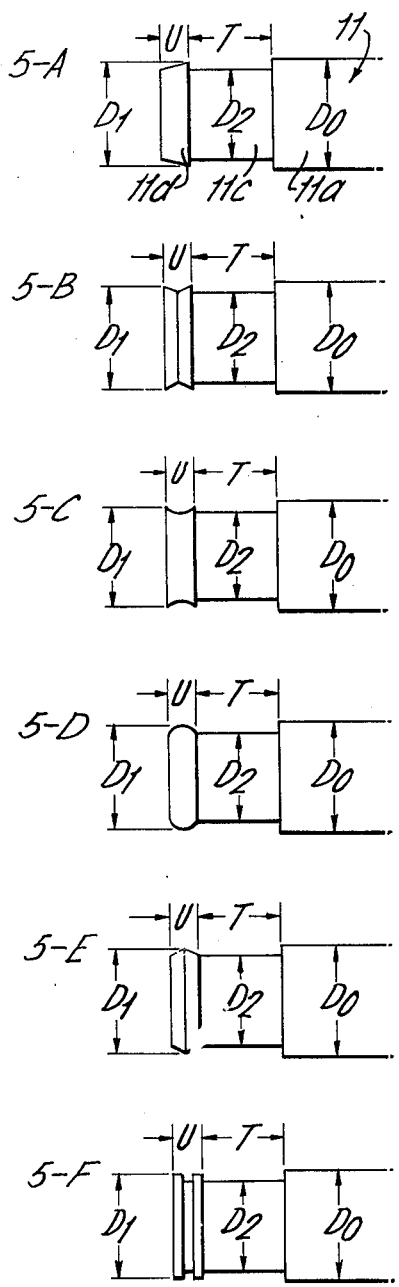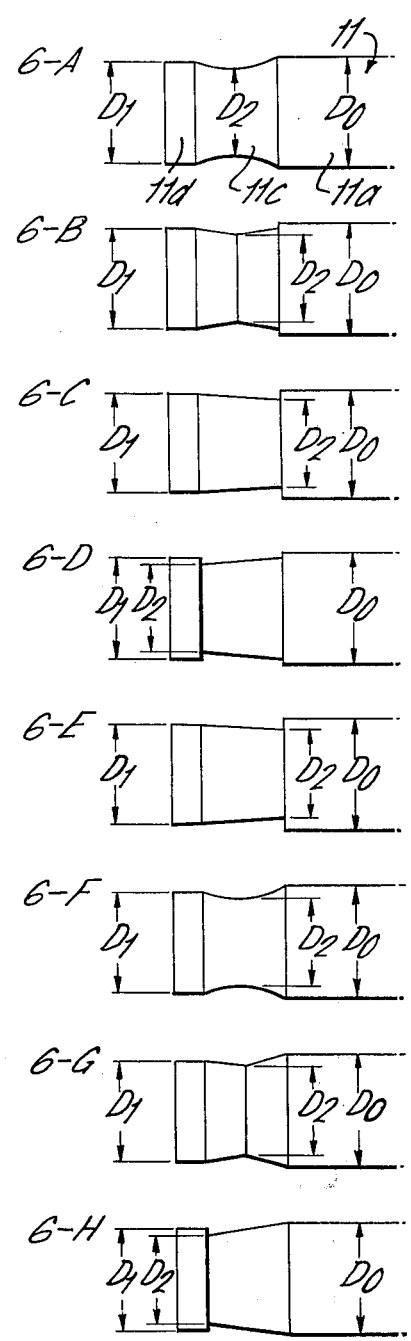

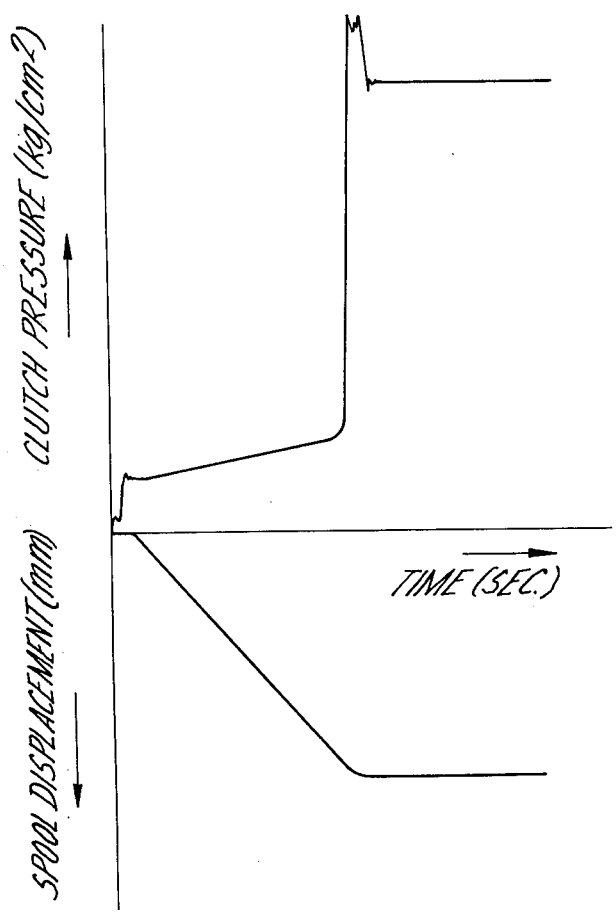

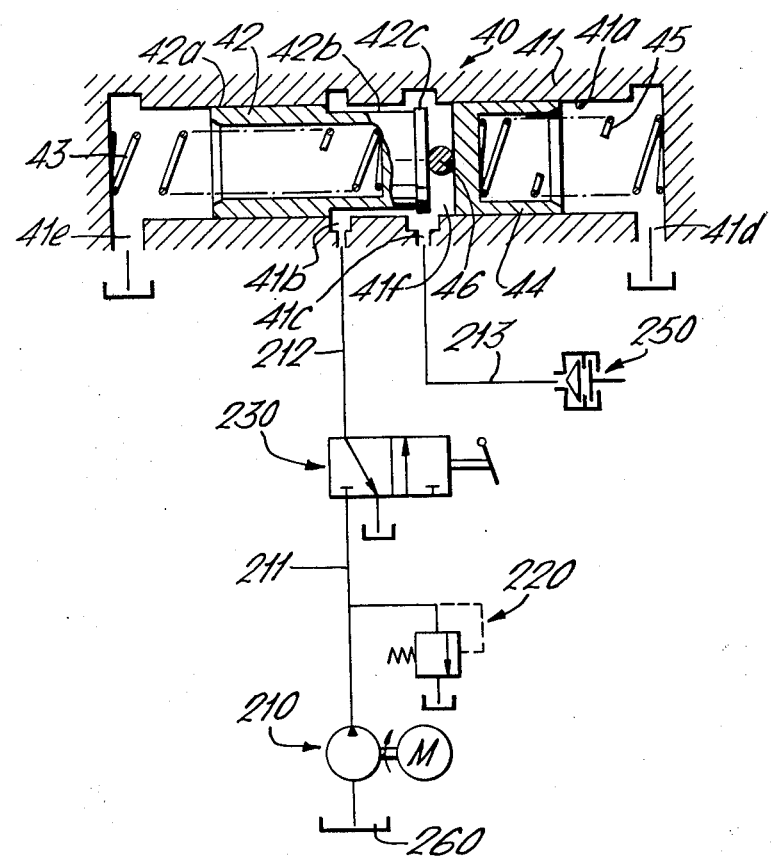

HYDRAULIC MODULATOR VALVE

This is a continuation of application Ser. No. 269,102, filed July 5, 1972 now abandoned.

BACKGROUND OF THE INVENTION

The present invention relates to a hydraulic modulator valve, and more particularly to a novel improvement for the type of hydraulic modulator valve, of which the stepped spool makes axial displacements to regulate fluid pressure.

To modulate line pressure within a control system for a hydraulically operated mechanism, such as an automatic hydraulic frictional engaging mechanism of a forklift truck or other vehicles, there has been introduced a modulator valve including a stepped spool axially slidable therein. The stepped spool is provided with a large diameter portion to be hermetically engaged in the bore of the valve and a small diameter portion cooperating with inlet and outlet ports drilled on the valve casing so as to form an annular throttle passage.

The axial displacements of the spool control the line pressure to be supplied to a hydraulic actuator for the hydraulically operated mechanism. With the type of modulator valve as explained, the pressure control operation may be realized essentially in a desired condition in its initial and final stages. The problem is that no ideal fluid pressure control characteristics are obtainable in the middle stage which is important in the control operation particularly for the actuators of the hydraulically operated mechanism for vehicles. That is, the factors for pressure control are the difference in diameter between the large and small diameter portions of the spool and the axial length of the small diameter portion. Only with these factors, there exists a distinct limitation in controlling the modulating characteristics by this type of modulator valve.

Furthermore, in actual usage of the conventional type of modulator valve, the displacement of the spool is manually controlled for fluid pressure modulating operation. This causes unsmooth operation of the hydraulic actuators because of time gaps produced by differential operations between the valve and the actuator.

SUMMARY OF THE INVENTION

A prime object of the present invention is, therefore, to provide a hydraulic modulator valve which is enabled to realize ideal modulating characteristics all through the initial, middle and final hydraulic control operation thereof.

Another object of the present invention is to provide a hydraulic modulator valve, having the above mentioned characteristics, wherein the modulating characteristics thereof can be freely varied by changes of the shape of the annular throttle passage formed between the valve bore and the valve spool.

A further object of the present invention is to provide a hydraulic modulator valve, having the above mentioned characteristics, wherein the valve spool can automatically and properly be displaced in response with the line pressure bypassed into the valve, the pressure modulated by the valve itself or signal pressure responsive to the vehicle speed, thereby to control the operation of the actuator in the most desirable condition without time gaps.

Still another object of the present invention is to provide a hydraulic modulator valve, having the above mentioned characteristics, wherein an accumulator is combined with the valve so as to control functionally the initial operation of the valve, thereby to further improve the modulating characteristics of the valve.

A hydraulic modulator valve according to the present invention briefly summarized, therefore, comprises a casing including a bore therein and a stepped spool axially and slidably engaged within the bore to form an annular fluid throttle passage against the circumference of the bore between a first and a second ports drilled through the casing. And the modulator valve further includes spool actuating means for automatically controlling axial displacement of the spool. The stepped spool is provided with a large diameter portion to be hermetically engaged within the bore, a small diameter portion and a medium diameter portion in sequence, the throttle passage being formed between the bore and the medium and small portions of the spool.

BRIEF DESCRIPTION OF THE DRAWINGS

The above and other objects, features and advantages of the present invention will become more readily apparent from the following detailed description of the preferred embodiments with reference to the accompanying drawings forming a part of the specification.

In the drawings:

FIGS. 5, 5-A–5-F and 6,6-A–6-H illustrate various modifications of the spool used for the modulator valve in FIG. 3.

FIG. 11 is a characteristic graph showing relative relation between the clutch pressure changes and time progress for operation of the modulator valve in FIG. 10.

FIG. 12 shows a hydraulic control system wherein another embodiment of the present invention is put in actual use, the modulator valve being illustrated in an elevational section.

DESCRIPTION OF THE PREFERRED EMBODIMENT

Figure 1:
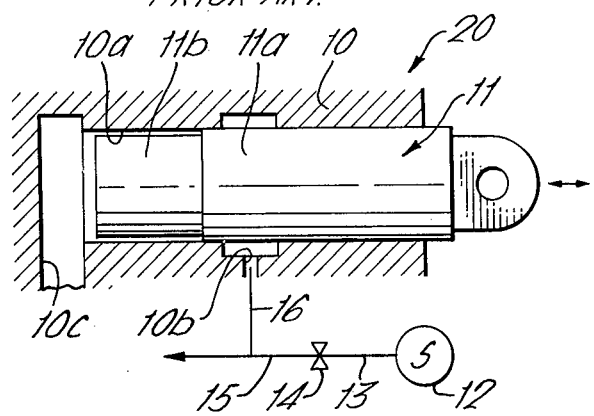
FIG. 1 shows an elevational section of a modulator valve of a conventional type.

Referring now to the attached drawings, a first embodiment of the present invention is described in comparison with a conventional embodiment. For a better comparison, disclosed first in FIG. 1 is a preferred embodiment of a prior art modulator valve generally depicted with numeral 20. There is shown in the figure a casing 10 having a cylindrical bore 10a. The bore has a drain port 10c at the left end portion thereof in the figure and an inlet port 10b is provided approximately at the center of the bore 10a. A stepped spool 11 is snugly and slidably engaged within the bore 10a. The spool 11 is so designed as to have a large diameter portion 11a and a small diameter portion 11b, the difference being very small between the diameters of the two portions 11a and 11b. The inlet port 10b is connected to a bypass conduit 16 which is in turn connected to a line pressure conduit 15. The conduit 15 extends through a conduit 13 and an orifice 14 to a fluid pressure source 12 which produces line pressure of an approximately constant value. The conduit 15 is to supply the line pressure to a hydraulically operated mechanism (not shown).

Fluid pressure discharged from the source 12 flows through the conduit 13 and is reduced in value by the orifice 14. The fluid pressure further flows through the conduit 15 to the hydraulically operated mechanism, and at the same time, is delivered to the inlet port 10b through the bypass conduit 16. While the spool 11 is conditioned to the position illustrated in FIG. 1, however, the fluid pressure delivered to the inlet port 10b is blocked by the large diameter portion 11a of the spool 11. This situation corresponds with A portion in FIG. 2.

A gradual rightward movement of the spool 11 starts to connect the inlet port 10b with the drain port 10c through a narrow annular fluid throttle passage formed between the small diameter portion 11b and the bore 10a. The fluid pressure within the conduits 15 and 16 is rapidly lowered until throttling operation by the narrow passage is effected. This decrease of fluid pressure value corresponds with B portion in FIG. 2. Then, in accordance with the further rightward movement of the spool 11, the length of the throttle passage becomes shorter to decrease the value of the fluid pressure within the conduits 15 and 16 as shown in D portion in FIG. 2.

Figure 2:
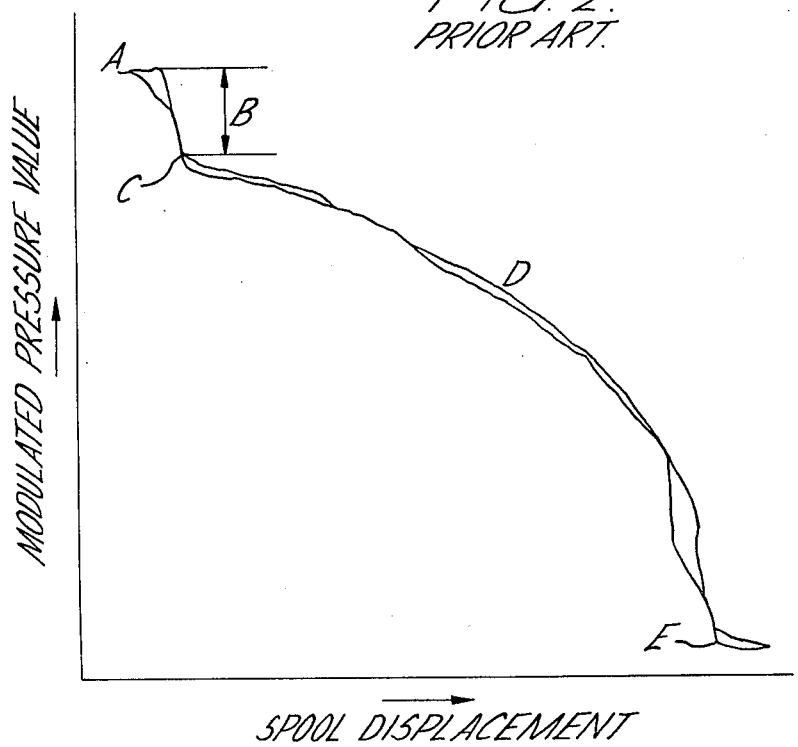
FIG. 2 is a graph showing the fluid pressure changes in response to the displacements of the spool of the modulator valve in FIG. 1.

The D portion in FIG. 2 becomes a curve because the throttle passage between the small diameter portion 11b and the bore 10a is very narrow. As the diameter of the small diameter portion 11b gets smaller, the D portion becomes more linear. As long as the length of the small diameter portion 11b is kept unchanged, however, the slope degree of the D portion only changes in accordance with the changes of the diameter of the small diameter portion 11b. And there is no change at all at the E portion, which results in deciding the height of the C portion in response with slope degree changes caused by diameter changes of the small diameter portion 11b in FIG. 2. When the spool 11 is displaced leftward from a rightward place over the E portion, the value of the fluid pressure is varied approximately in a reverse proportion to the variation caused by the rightward movement of the spool 11. Therefore, the two curves overlap approximately to each other. In FIG. 2 the curves are obtained from actual fluid pressure variation.

Furthermore, in actual usage of the conventional modulator valve 20, the displacements of the spool 11 are manually controlled for fluid pressure modulating operation. This causes unsmooth operation of the hydraulically operated mechanism because of time gaps produced by differential operations between the valve and the mechanism.

Figure 3:
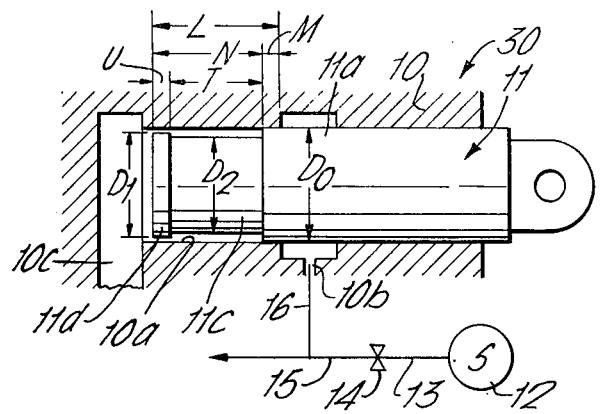
FIG. 3 is an elevational cross-sectional view of a modulator valve in accordance with the present invention.
Figure 4:
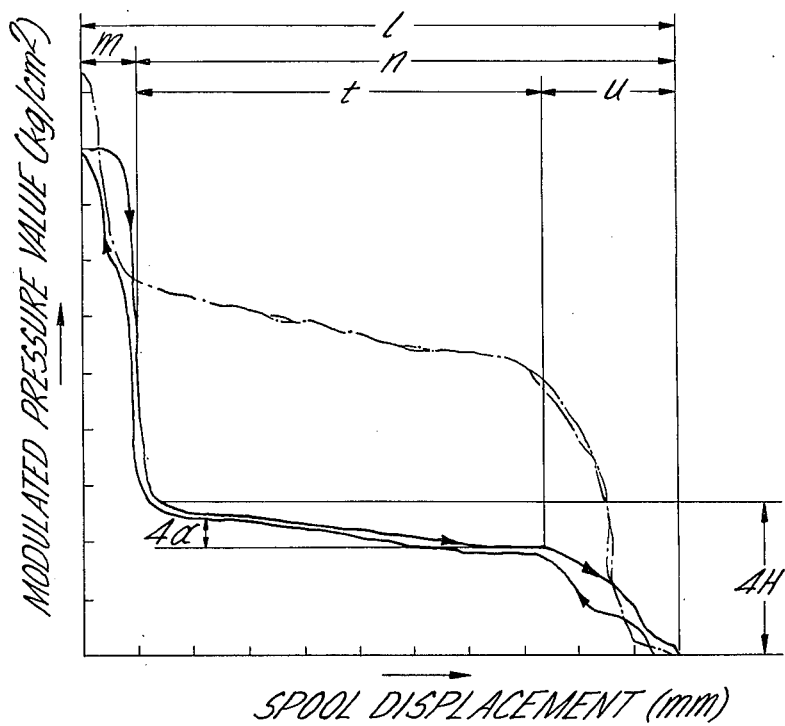
FIG. 4 is a graph showing relative relation between the displacements of the spool of the modulator valve in FIG. 3 and the changes of the modulated pressure values.

FIGS. 3 and 4 are referred to for a modulator valve 30 of the present invention and disclosed hereinafter are the construction and operation of the valve 30. In FIGS. 3 and 4, the same or similar reference numerals are used for the same or similar construction parts or portions in FIGS. 1 and 2. Now particularly referring to FIG. 3, the large diameter portion 11a is designed to be same in diameter with the large diameter portion 11a in FIG. 1 and also a medium diameter portion 11d has the same diameter as that of the small diameter portion 11b in FIG. 1. A small diameter portion 11c in FIG. 3 has a properly smaller diameter than that of the medium diameter portion 11d. The total axial length of the medium and small diameter portions 11d and 11c in FIG. 3 is equal to the axial length of the small diameter portion 11b in FIG. 1. All other portions of the valve 30 in FIG. 3 remain as same as those in FIG. 1.

Shown in FIG. 4 are the modulated fluid pressure value changes within the conduits 15 and 16 in accordance with the rightward displacement of the spool 11 within the valve 30 in FIG. 3. FIG. 4 tells that the fluid pressure value within the conduits 15 and 16 rapidly decreases upon completion of connection between the inlet port 10b and the drain port 10c through the throttle passage. The reduced amount of the fluid pressure value is observed down to the H height which is decided by the proportion of the diameter $D_1$ of the medium diameter portion 11d to the diameter $D_2$ of the small diameter portion 11c and the proportion of the diameter $D_0$ of the large diameter portion 11a to the diameter $D_1$ of the medium diameter portion 11d.

In accordance with the rightward displacement of the spool 11, the throttle passage between the small diameter portion 11c and the bore 10a becomes gradually smaller, thereby to gradually decrease the fluid pressure throttling amount. Thus, produced within the conduits 15 and 16 is such fluid pressure as regulated by the changes of the fluid pressure throttling amount. The reduction amount of the line pressure is defined by the axial length T of the small diameter portion 11c and the amount stays within a range measured by $t$ in FIG. 4.

When the small diameter portion 11c loses its fluid pressure reducing effect by further rightward displacement of the spool 11, the pressure reducing effect by the medium diameter portion 11d only remains. This remaining pressure throttling effect by the medium diameter portion 11d becomes gradually smaller responsive to further rightward displacement of the spool 11. Thus, the decreasing fluid pressure is controlled within a range shown with $u$ in FIG. 4; in this $u$ range, the curve is much sharper than in the $t$ range. The curving degree is defined by the proportion of $D_0$ to $D_1$. The $u$ range corresponds to the axial length U of the medium diameter portion 11d. The sum $n$ of the $t$ and $u$ ranges (FIG. 4) corresponds with the sum N of the axial lengths U and T of the medium and small diameter portions 11d and 11c (FIG. 3). With the present invention, the throttling effects of the valve 30 are obtained within the $n$ range.

In FIG. 4 the slope of the curve in the $u$ range and the length of the $u$ range are defined respectively by the diameter $D_1$ and axial length U of the medium diameter portion 11d. And the slope of the curve in the $t$ range and the length of the $t$ range are defined respectively by the diameter $D_2$ and axial length T of the small diameter portion 11c. The valve 30 of the present invention is so constructed as detailed hereinabove, thereby even the sum N of the respective lengths U and T of the medium and small diameter portions 11d and 11c is kept constant, changes of the diameter $D_1$ of the medium diameter portion 11d enables to vary freely the slope of the curve and the highest pressure value in the u range as well. And the slope of the curve and the highest pressure value or the height H in the t range can also be varied freely by changes of the diameter $D_2$ of the small diameter portion 11c. This allows very free designing of the valve 30.

Disclosed in reference with FIGS. 5-A to 5-F in FIG. 5 are several modifications in shape of the medium diameter portion 11d. A common feature of the disclosed modifications is that when the lengths of $D_o$, $D_1$, $D_2$, U and T are measured respectively to correspond with those used in FIG. 3, the curve of fluid pressure changes will have a slope very similar to that in FIG. 4. FIGS. 6-A to 6-H in FIG. 6 show other modifications, wherein disclosed are different shapes of the small diameter portion 11c. With these modifications, the fluid pressure changes can also be controlled correspondingly to the characteristic curve in FIG. 4.

In all the cases in the above modifications, when the diameters of the small diameter portion 11c are designed to be small sufficiently to disable the fluid pressure throttling effect at this particular portion, the curve in the t range in FIG. 4 will be slopeless and become a horizontal line.

Reference is made again to FIG. 3, provided all the measurements of casing 10 and the spool 11 of the valve 30 are kept unchanged, variation of the diameter of the orifice 14 can displace the fluid pressure control starting point of the valve 30. This variation of the orifice 14 will also cause vertical parallel displacement of the curve in the t range in FIG. 4, which depicts the fluid pressure changes by the variation of fluid throttling effect of the small diameter portion 11c. Sequentially, the slope of the curve in the u range in FIG. 4 makes changes. The dotted curve in FIG. 4 shows the fluid pressure changes when the diameter of the orifice 14 is set larger than that of the orifice 14 with which the fluid pressure control is carried out along the solid curve.

In FIG. 3, the ports 10b and 10c are defined respectively to be an inlet port and a drain port, but reverse arrangement can provide the same fluid pressure control. It should also be very clear that when the port 10b (or 10c) is connected with the pressure source 12, the port 10c (or 10b) being a drain port, the fluid pressure is regulated in accordance with the leftward displacement of the spool 11 in a reverse way against the control shown in FIG. 4, that is, in this case the fluid pressure changes from a low value to a high value.

Figure 7:
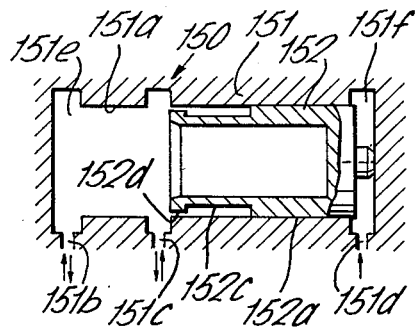
FIGS. 7 to 9, inclusive, show other embodiments of the modulator valve in FIG. 3.
Figure 9:
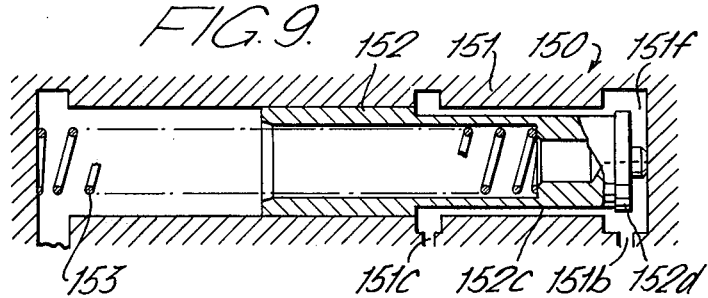

Reference is made to FIGS. 7 and 9, inclusive, for modifications of the modulator valve 30 explained in the above embodiment. A modulator valve 150 illustrated in FIG. 7 comprises a casing 151 with a cylindrical bore 151a therein. A spool 152 is snugly and slidably engaged within the bore 151a and is provided with small, medium and large diameter portions 152c, 152d and 152a. The casing 151 is further provided with ports 151b and 151c respectively as an inlet port and an outlet port or vice versa, the ports 151b and 151c being positioned in such places as to be affected by the small and medium diameter portions 152c and 152d of the spool 152 in proportion with gradual leftward displacement of the spool 152. The spool 152 divides the bore 151a into two pressure chambers 151e and 151f. The pressure chamber 151e is normally in open communication with the ports 151b and 151c, while the pressure chamber 151f is connected to an inlet port 151d.

In this modification, for example, the ports 151b and 151d are connected to the line pressure source and a signal pressure respectively, while the port 151c is connected to an actuator of the hydraulically operated mechanism. In operation, the line pressure is delivered to the inlet ports 151b and the signal pressure is supplied to 151d at a time. The line pressure is then supplied into the pressure chamber 151e. The line pressure within the pressure chamber 151e, however, flows to the actuator through the outlet port 151c so as to cause a value difference between the pressures in the chambers 151e and 151f. This difference, the value being higher in the chamber 151f, causes the leftward displacement of the spool 152 to effect the pressure throttling operation of the valve 150. And the fluid pressure changes controlled by the valve 150 corresponds with the changes shown in FIG. 4.

Figure 8:
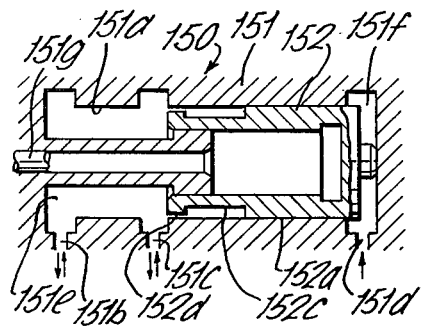

Disclosed in FIG. 8 is the same valve as illustrated in FIG. 7 with an additional extended portion from the left side wall of the bore 151a, this portion slidably engaging at its end with the inside circumference of the spool 152. And the extended portion is provided with a cylindrical passage therein, which opens to a port 151g.

In actual usage of this valve 150 when applied to an automatic transmission control system for vehicles, throttle pressure is supplied into the cylindrical passage through the port 151g to act on the spool 152 against governor pressure supplied into the pressure chamber 151f. And obtained is a hydraulic pressure in a value corresponding to the necessary torque to complete the clutch engagement of the transmission control system responsively to the necessary time for torque transmission. As it is clearly observed, this is realized by changes of the pressure throttling effect between the ports 151b and 151c, the changes being controlled automatically to produce the most desirable pressure value for engaging the clutch means. The same reference numerals are used in FIG. 8 as those in FIG. 7 indicate the same parts or portions.

Disclosed in FIG. 9 is another embodiment of the modulator valve, wherein similar construction parts and portions are depicted with the same reference numerals as in FIG. 7. Features characterized in this embodiment are the position of the spool 152 within the bore (151a) and a spring 153 normally biasing the spool 152 to its right end position as illustrated in the figure.

When the port 151b is connected to the fluid line pressure source and the port 151c is used as a drain port, the line pressure supplied into the chamber 151f starts to displace the spool 152 leftward against the biasing force of the spring 153, being throttled at the same time by the throttle passage formed between the bore 151a and the small diameter portion 152c. In accordance with the leftward displacement of the spool 152, the throttling effect of the throttle passage decreases to decrease, in turn, the line pressure supplied to the actuator of the hydraulically operated mechanism through the drain port.

However, when the port 151c is connected to the line pressure source and the port 151b is used as an outlet port, the line pressure is supplied into the chamber 151f after reduced in value by way of the throttle passage. The resilient force of the spring 153 being proportionately determined, the throttled pressure urges the spool 152 leftward against the biasing force of the spring 153. The leftward displacement of the spool 152 works to decrease the throttling effect of the throttle passage to result in increase of the line pressure supplied to the actuator.

As described in detail hereinabove, the spools of the modified valves 150 are automatically and properly displaced. And the flow of the fluid pressure is regulated without time gaps in accordance with the pressure throttling operation responsive to the displacement of the spools 152. This means continuous fluid pressure changes are automatically and smoothly obtained to operate the hydraulically operated mechanism.

Figure 10:
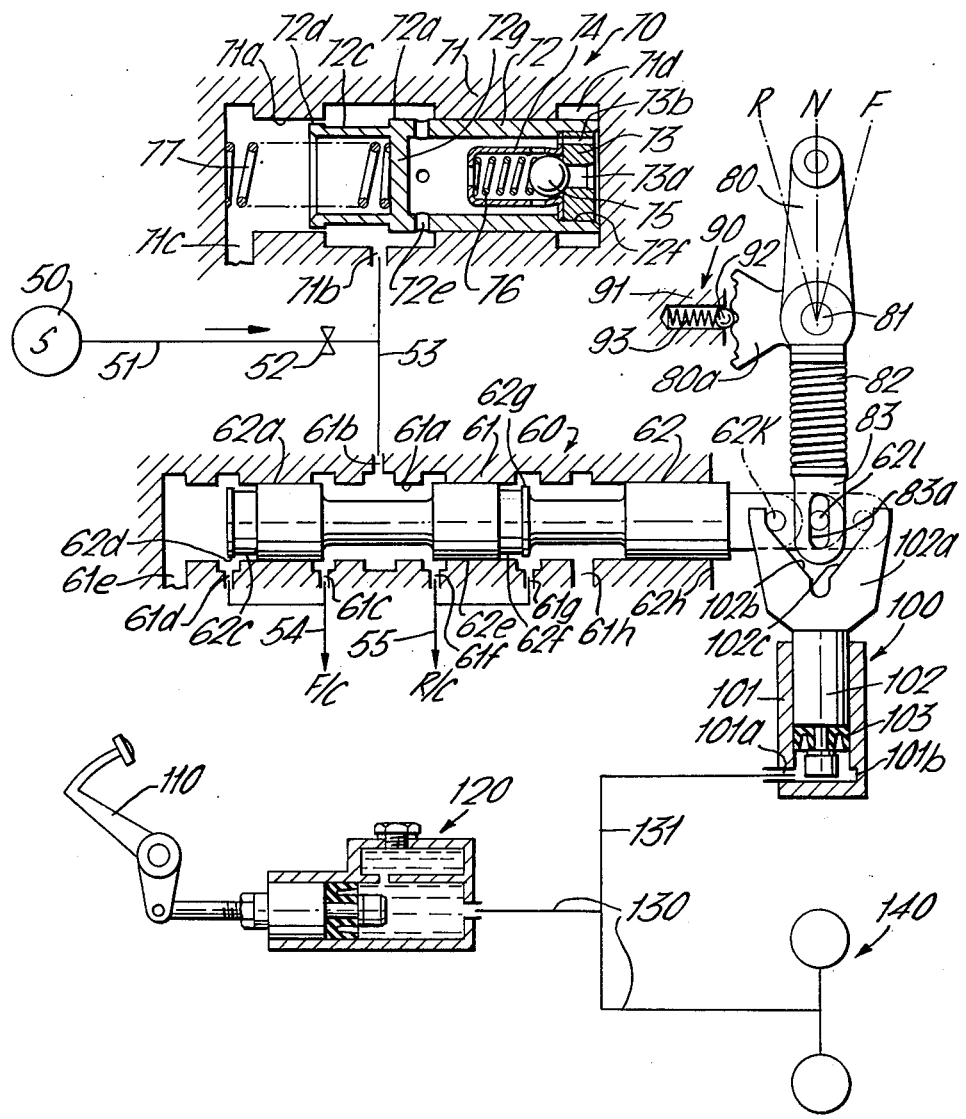
FIG. 10 shows a hydraulic control system wherein another embodiment of the present invention is applied to a frictional engaging mechanism of a forklift truck, all the construction components being shown in an elevational cross-section.

FIG. 10 illustrates an actual application of a modulator valve 70 of the present invention, wherein the valve 70 is operatively connected with a hydraulic clutch servo-means (not shown) through a inching/selector valve 60 (hereinafter called simply "inching valve").

The modulator valve 70 comprises a casing 71 having a cylindrical bore 71a. The casing 71 is also provided with an inlet port 71b and a drain port 71c. Snugly and slidably engaged within the bore 71a is a spool 72 provided with a large diameter portion 72a, a medium diameter portion 72d and a small diameter portion 72c. The spool 72 is provided with a partition wall 72g at the left end of the large diameter portion 72a, the wall 72g dividing the interior of the spool 72 into two chambers. A radial connecting hole 72e is drilled through the wall of the large diameter portion 72a for communication of the cylindrical bore 71a with the right chamber formed by the partition wall 72g inside the spool 72. A plug 73 with a through hole 73a along its central axis and an axial orifice 73b at its upper portion is hermetically engaged in the opening 72f provided at the right end of the spool 72. A spring retainer 74 is mounted on the left side of the plug 73 so as to extend into the right chamber inside the spool 72. The spring retainer 74 contains therein a spring 76 for biasing a check ball 75 rightward in the figure to normally close the through hole 73a. The modulator valve 70 further includes a spring 77 stretched between the left side wall of the bore 71a and the partition wall 72g so as to normally bias the spool 72 rightward.

The inching valve 60 comprises a housing 61 having therein a cylindrical bore 61a and thereon ports 61b, 61c, 61d, 61e, 61f, 61g and 61h. Snugly and slidably engaged within the bore 61a is a spool 62 provided with lands 62a, 62c, 62d, 62e, 62f, 62g and 62h, said ports 61e and 61h are drain ports.

The ports 61c and 61d are in connection with a conduit 54 extending to a forward clutch means for completing the forward drive power train of the transmission of a vehicle. Meanwhile, the ports 61f and 61g are connected with a conduit 55 which is in turn connected to a rearward clutch means for completing the reverse drive power train. While the spool 62 is conditioned to its neutral position, the large, medium and small diameter lands 62a, 62d and 62c are situated between the ports 61c and 61d, and the large, medium and small diameter lands 62e, 62g and 62f are positioned inbetween the ports 61f and 61g. Under this condition, completed is communication of the port 61b with the ports 61c, 61d and 61e, and also with the ports 61f, 61g and 61h.

The inlet port 71b of the modulator valve 70 and the inlet port 61b of the inching valve 60 are connected to a line pressure source 50, which discharges fluid pressure of an approximately constant value, through a conduit 51, an orifice 52 and a conduit 53.

A selector lever 80 is swingably journalled on a vehicle body portion or the transmission of the vehicle by way of a pin 81 for conditioning the transmission for its forward, neutral or reverse position. The selector lever 80 has a detent claw 80a firmly mounted thereon. A detent 90 is mounted on the vehicle body portion or the transmission and has a hole therein to contain a spring 93 for biasing a ball 92 against the detent claw 80a, thus, by cooperated operation of the mentioned detent components, the selector lever 80 can be held in a selected position.

Fixed onto the lower end of the selector lever 80 is a flexible connecting member 82 on the other end of which an engaging member 83 is firmly secured. This engaging member 83 has an elliptic hole 83a to engage with a projecting pin 62k provided on the right margin of the spool 62 of the inching valve 60. An inching cylinder 100 is so provided that the pin 62k of the spool 62 is positioned in the upper portion of the Y-shaped open area of a V-shaped arm 102a of the cylinder 100. The inching valve 60 and the inching cylinder 100 are in such a relative arrangement that the pin 62k of the spool 62 stays in the center of the upper portion of the Y-shaped opening while the spool 62 is conditioned to its neutral position.

The inching cylinder 100 comprises a casing 101 having a cylindrical bore therein to receive a piston 102 snugly and reciprocably. On the upper side of the piston 102, the V-shaped arm 102a is firmly fixed and on the other side of the piston 102, is provided a piston cup 103 for hydraulic sealing of a pressure chamber 101b formed between the lower side of the piston 102 and the interior annular wall of the casing 101. An inlet port 101a is drilled through the lower wall of the casing 101 and is connected to a conduit 131 which is, in turn, connected to a conduit 130. This conduit 130 leads to an outlet port of a conventional master cylinder 120 operatively connected with a foot brake pedal 110. The conduit 130 is at its other end in connection with wheel cylinders 140.

Described below is operation of the control system explained in detail in reference with FIG. 10. In FIG. 10, the inching valve 60 is conditioned to its neutral position. The fluid line pressure discharged from the source 50 is delivered into the inlet port 61b of the inching valve 60 through the conduit 51, the orifice 52 and the conduit 53 in sequence. At this time, the inlet port 61b is connected with the drain port 61e by way of the ports 61c and 61d and also with the drain port 61h by way of the ports 61f and 61g. Thus, the fluid pressure delivered into the inlet port 61b is drained out from the drain ports 61e and 61h to keep the pressure value within the conduit 53 equal to the atmospheric pressure. Consequently, the modulator valve 70 stays inoperative.

Clockwise rotation of the selector lever 80 around the pin 81 results in leftward displacement of the spool 62 within the bore 61a by way of the flexible connecting member 82. The spool 62, when displaced leftward, closes the ports 61d and 61f respectively by the large diameter lands 62a and 62e thereof. And the fluid pressure within the conduit 53 is supplied to the servo chamber of the forward clutch means through the ports 61b, 61c and the conduit 54. At the same time, the fluid pressure is also supplied to the modulator valve 70 through the inlet port 71b thereof. The fluid pressure is reduced by the medium diameter portion 72d of the spool 72 and discharged through the drain port 71c. Under this state, the fluid pressure is regulated by the modulator valve 70 so as to be lower in value than the fluid pressure within the conduit 51 interposed between the pressure source 50 and the orifice 52. This fluid pressure is then supplied into a pressure chamber 71d of the modulator vlave 70 through the hole 72e of the spool 72 and the orifice 73b of the plug 73, thereby to urge the spool 72 leftward in the figure. And practically, when the fluid pressure exceeds the rightward resilient force of the spring 77, the spool 72 makes its leftward displacement to form the narrow annular fluid throttle passage by the interior wall of the bore 71a and the circumference of the small diameter portion 72c. The additional pressure reducing effect to that of the passage by the medium diameter portion 72d causes gradual increases of the fluid pressure value within the conduit 53 or the fluid pressure value regulated by the valve 70. The increased fluid pressure delivered into the pressure chamber 71d thrusts the spool 72 further leftwardly so as to cause further increase of the fluid pressure value. This fluid pressure controlling operation terminates after the connection between the ports 71b and 71c is blocked by the large diameter portion 72a in accordance with the leftward movement of the spool 72. Consequently, the forward clutch means realized its gradual and smooth engaging operation by way of supply of the modulated fluid line pressure. After the inlet port 71b is closed by the large diameter portion 72a of the spool 72, the fluid pressure supplied to the clutch servo chamber continues to gradually increase while the pressure reducing effect of the orifice 52 remains. And when the fluid pressure within the clutch servo chamber increases to the equal in value to that within the conduit 51, the clutch means completes fully its engaging operation to start the vehicle. The changes of the fluid pressure control through the above operation is well illustrated in FIG. 11.

In necessity of inching operation during the above control operation, depressing actuation is given onto the brake pedal 110. This actuation pressurizes operation fluid within the master cylinder 120. The fluid pressure is delivered to the wheel cylinders 140 to effect braking operation, and at the same time, is bypassed into the pressure chamber 101b of the inching cylinder 100. Then, the piston 102 of the inching cylinder 100 is pushed upward. Accordingly, the pin 62k of the spool 62 displaced leftward is returned to its neutral position shown with solid line by way of a cam portion 102b of the arm 102a against the resilient force of the flexible connecting member 82.

In the case that the spool 62 of the inching valve 60 is selectively conditioned to its reverse position, the pin 62k is displaced rightward. And the upward movement of the piston 102 of the inching cylinder 100 lets a cam portion 102c of the arm 102a return the pin 62k to its neutral position shown with solid line in the figure against the resilient force of the flexible connecting member 82. Provided the depressing actuation onto the brake pedal 110 is maintained approximately at a certain constant value, the upward displacement of the inching cylinder piston 102 can return the inching valve spool 62 toward its neutral position until the hydraulic upward urging force onto the piston 102 is balanced by the resilient force of the flexible connecting member 82 to return the spool 62 to its selected position.

When the inching valve spool 62 makes its displacement toward its neutral position after it is once conditioned to its forward or reverse position, clutch engaging presssure is changed in response to the displacing amounts of the spool 62. This means that proper or desired half- or non-clutching operation is obtainable in response to the depressing actuation given onto the brake pedal 110. The resilient force of the flexible connecting member 82 is determined in respect to resilient force of a brake-shoe return springs (not shown) within the wheel cylinders 140. So that while the clutch means keeps its half-clutching operation, not enough braking effect is obtainable through the wheel cylinders 140 and the braking effect by the wheel cylinders is increased sufficiently to arrest the vehicle after the clutch means completes its disengaging operation.

Figure 13:
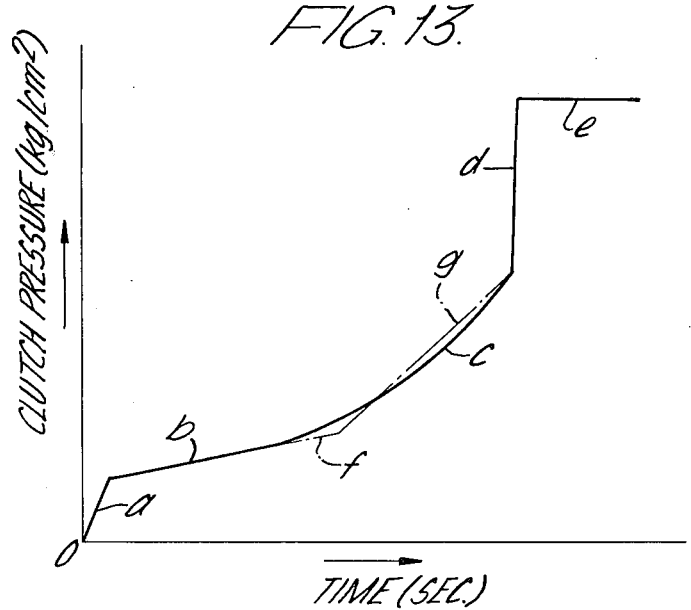
FIG. 13 is a characteristic graph showing relative relation between the clutch pressure changes and time progress for operation of the modulator valve in FIG. 12.

Described in detail hereinafter in reference to FIGS. 12 and 13 is an actual application of a modified modulator valve according to the present invention. Now reference is made particularly to FIGS. 12 and 13, there is shown a modulator valve 40 which comprises a housing 41 including a cylindrical bore 41a therein, an inlet port 41b, an outlet port 41c, a drain port 41d, and a drain port 41e. Engaged snugly and slidably within the left portion of the bore 41a is a spool 42 provided with a large diameter portion 42a, a small diameter portion 42b and a medium diameter portion 42c in sequence from left to right in the figure. A spring 43 is stretched between the left side wall of the bore 41a and the right interior wall of the spool 42 so as to normally biase the spool 42 rightward in the figure. In the rightward portion of the bore 41a, an accumulator piston 44 is snugly and reciprocably engaged. The accumulator piston 44 is combined with a spring 45 for biasing the accumulator piston 44 normally leftward. A stop pin 46 is radially fixed in the bore 41a for regulating relative displacements of the spool 42 and the piston 44. A pressure chamber 41f is formed with the bore 41a, the right side wall of the spool 42 and the left side wall of the piston 44.

The inlet port 41b of the modulator valve 40 is connected to a fluid reservoir 260 by way of a conduit 212, a selector valve 230, a conduit 211, a relief valve 220 disposed within conduit 211 and a fluid pump 210 driven by a motor M. The conduits 211 and 212 are connected respectively to inlet and outlet ports of the selector valve 230. The relief valve 220 is to keep the fluid presssure within the conduits 211 approximately at a constant value. The outlet port 41c of the modulator valve 40 is connected through the conduit 213 to an actuator of clutch means 250. The drain port 41d and 41e are in connection with the reservoir 260. In FIG. 12, the ports 41b and 41c are utilized respectively for supplying fluid line pressure to the modulator valve 40 and for discharging the regulated fluid pressure to the clutch means 250, but these two ports can be utilized vice versa.

In operation of the above described modulator valve 40, line pressure is constantly discharged from pump 210 into the conduit 211 and controlled at an approximately constant value by the relief valve 220. This controlled line pressure is then delivered into the selector valve 230.

In FIG. 12, the selector valve 230 is conditioned to block the connection between the conduits 211 and 212, the conduit 212 being connected with the reservoir 260. Under this situation, the actuator of the clutch means 250 is connected to the reservoir 260 through the conduit 213, the pressure reducing passage between the spool 42 and the bore 41a, the conduit 212 and the selector valve 230 in sequence, thereby the clutch means is conditioned to its disengaged position.

When the selector valve 230 is switched over to connect the conduit 211 with the conduit 212, the line pressure within the conduit 211 is supplied to the modulator valve 40 through the conduit 212 and the inlet port 41b. The line pressure is then delivered into the pressure chamber 41f through the narrow throttle passage between the bore 41a and the small diameter portion 42b of the spool 42 and, in turn, reaches to the actuator of the clutch means 250 through the outlet port 41c and the conduit 213.

When the value of the line pressure increases up to certain one within the pressure chamber 41f, the accumlator piston 44 starts its rightward displacement. Until the accumulator piston 44 starts its displacement, the pressure value increases rapidly as understood from a sharp slope shown by solid line $a$ in FIG. 13. When the piston 44 starts its rightward displacement, the counter resilient force of the spring 45 against the piston 44 is effected so as to gradually increase the pressure value within the pressure chamber 41f as shown with solid line $b$ of which the slope degree is less than that of the solid line $a$. Then, at the stroke end of the accumlator piston 44, the counter resilient force effect of the spring 45 becomes ineffective, and further increase of the line pressure within the pressure chamber 41f causes leftward displacement of the spool 42 against resilient force of the spring 43. This leftward displacement of the spool 42 decrease gradually the length of the throttling passage between the bore 41a and the small and medium diameter portions 42b and 42c of the spool 42. Therefore, at the starting point of the leftward movement of the spool 42, the pressure value within the pressure chamber 41f shows still further gradual increase. As the length of the throttling passage decreases however, the pressure value within the pressure chamber 41f makes rather sharp increase as shown with solid curve $c$ and around the stroke end of the spool 42, the pressure value increase becomes sharper. When the spool 42 is displaced to its stroke end to complete full connection between the inlet port 41b and the outlet port 41c, the pressure value within the pressure chamber 41f or the actuation of the clutch means 250 increases to become equal to that of the line pressure as shown with solid lines $d$ and $e$ in FIG. 13.

The changes of the pressure values shown in FIG. 13 corresponds to the clutch engaging operation as explained hereinafter. The rapid pressure increase shown with the solid line $a$ is utilized for compensating non-effective stroke of the actuator for the clutch means 250 at the initial stage of the clutch engaging operation. The gradual increase of the pressure represented by the solid line $b$ is necessary for loose engagement of the clutch means 250. Then required is a smooth increase represented by the solid curve $c$ up to the point where the solid curve $c$ and the solid line $d$ cross to each other, so that obtained is sufficient hydraulic pressure to complete the clutch engagement.

It should be clear that the highest pressure value, that is the line pressure, must be defined higher than that necessary for full engagement of the clutch means to secure the engaging operation of the clutch means. For this purpose, in prior art modulator valves, adopted is an orifice control device comprising an accumulator and a fixed orifice, thereby to obtain the hydraulic pressure changes shown with the solid line $a$, the solid line $b$, a dotted line $f$, a dotted line $g$, the solid line $d$ and the solid line $e$. In this way of regulating the fluid pressure, however, as seen well in FIG. 13 the dotted line $g$ is linear, which causes a very rapid pressure increase at the point where the two dotted lines $f$ and $g$ cross to each other. This produces shocks in the clutch engaging operation.

In the device illustrated in FIG. 12, however, the dotted lines $g$ and $f$ are replaced by a solid curve $c$ for smooth pressure increase, so that the unpleasant shocks produced in the clutch engaging operation can substantially be eliminated.

Having now fully set forth both structure and operation of preferred embodiments of the concept underlying the present invention, various other embodiments as well as certain variations and modifications of the embodiments herein shown and described will obviously occur to those skilled in the art upon becoming familiar with said underlying concept. It is to be understood, therefore, that within the scope of the appended claims, the invention may be practiced otherwise than as specifically set forth herein.

What is claimed is:

1. In an hydraulic modulator of the type including a casing with a bore therein, first and second ports in said casing, a stepped spool axially and slidably engaged within said bore and forming with the circumference of the bore an annular fluid throttle passage between said ports, and spool actuating means for controlling axial displacement of the spool, the improvement wherein said stepped spool comprises a large diameter portion hermetically engaged within said bore, a small diameter portion and a medium diameter portion in sequence and both slightly lesser diameter then said bore, said throttle passage being formed by said bore and said medium and small diameter portions of said spool, wherein said spool actuating means comprises a pressure responsive means on said spool and a pressure chamber formed in the bore of said casing in open communication with said second port, resilient means for biasing said spool to its normal position such as to hold said throttle passage in the maximum length thereof, and an accumulator disposed within said pressure chamber, wherein said accumulator comprises a piston axially slidably engaged within said bore and resilient means biasing said piston toward said spool, and wherein a stopper means is provided in said pressure chamber which engages both said spool and piston when in their normal positions to limit further motion of the spool and piston toward one another.

2. An hydraulic modulator as set forth in claim 1, wherein said stopper means is a stop pin provided in said pressure chamber.

* * * * *